Nov. 18, 1969  R. J. EISENHAUER ET AL  3,479,389
PRODUCTION OF OLEFINIC NITRILES BY CATALYTIC DEHYDRATION
OF MONOHYDROXYLATED PARAFFINIC NITRILES
AND SUBSEQUENT FLASH DISTILLATION
Filed March 16, 1967
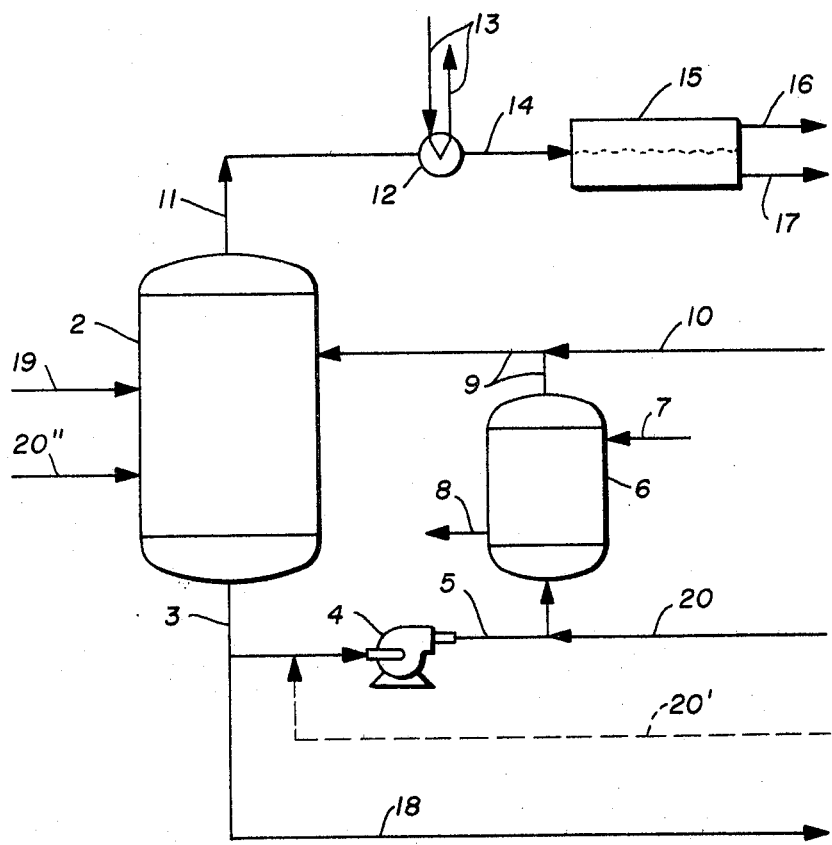
INVENTORS
P. W. EVANS
R. J. EISENHAUER
BY George R. Beck
ATTORNEY

United States Patent Office 3,479,389
Patented Nov. 18, 1969

3,479,389
PRODUCTION OF OLEFINIC NITRILES BY CATALYTIC DEHYDRATION OF MONO-HYDROXYLATED PARAFFINIC NITRILES AND SUBSEQUENT FLASH DISTILLATION
Roy J. Eisenhauer and Phillip W. Evans, Pensacola, Fla., assignors to Monsanto Company, St. Louis, Mo., a corporation of Delaware
Filed Mar. 16, 1967, Ser. No. 623,583
Int. Cl. C07c 121/30
U.S. Cl. 260—465.9                13 Claims

ABSTRACT OF THE DISCLOSURE

This invention relates to the preparation of an olefinic nitrile by catalytically dehydrating a liquid hydroxylated paraffinic nitrile and flash distilling a mixture of the dehydration reaction effluent and steam.

BACKGROUND OF THE INVENTION

Many olefinic nitriles such as acrylonitrile and α-methylacrylonitrile have a variety of commercially significant uses, for example as monomers in the synthesis of fiber-forming polymers such as polyacrylonitrile, as intermediates in the production of other polymerizable monomers such as methyl methacrylate, etc. Accordingly, a process by which such olefinic nitriles can be economically produced is highly desirable.

It is known that olefinic nitriles can be produced by catalytic dehydration of hydroxylated paraffinic nitriles. In general, a mixture of a liquid hydroxylated paraffinic nitrile and a suitable dehydration catalyst is heated to reaction temperature and the dehydration reaction effluent is distilled to drive off the resulting olefinic nitrile and byproduct water, leaving a liquid residue containing unreacted hydroxylated paraffinic nitrile, catalyst and high-boiling side products of the reaction. Thereafter, the vaporized olefinic nitrile and byproduct water can be separated by any convenient method such as condensation and decantation.

Heretofore, the major difficulties encountered in producing olefinic nitriles by conventional catalytic dehydration processes have been those associated with obtaining commercially acceptable yields. It has been found that relatively high reaction temperatures generally result in loss of product by degradation and substantial quantities of viscous high-boiling side products that interfere considerably with the flow of process streams. Since olefinic nitriles such as acrylonitrile form low-boiling azeotropes with water, it has been suggested that undesirably high reaction temperatures might be avoided by adding water to the reaction mixture in a quantity great enough for rapid separation of the olefinic nitrile by azeotropic distillation. However, the large quantity of additional water required to form the azeotrope unfortunately inhibits production of the olefinic nitrile to such an extent that competing reactions substantially lower the yield of the desired product. Since yield improvement is critical to economically attractive production of olefinic nitriles by catalytic dehydration of hydroxylated paraffinic nitriles, a process by which the required high yields can be conveniently obtained is highly desirable, and it is an object of this invention to provide such a process.

SUMMARY OF THE INVENTION

It has now been discovered that considerably improved yields of olefinic nitriles can be obtained from catalytic dehydration of hydroxylated paraffinic nitriles by flash distilling a mixture of the dehydration reaction effluent and steam. Thus, in generic scope, the present invention provides a process for preparing an olefinic nitrile which comprises catalytically dehydrating a liquid hydroxylated paraffinic nitrile, combining steam with the dehydration reaction effluent containing unreacted hydroxylated paraffinic nitrile and the corresponding olefinic nitrile, and flash distilling the resulting mixture to provide a vapor phase containing a substantial proportion of the olefinic nitrile and a liquid phase containing a substantial proportion of the unreacted hydroxylated paraffinic nitrile. Although the reaction can be carried out as a batch operation, the process of this invention is conveniently employed in a continuous embodiment in which the hydroxylated paraffinic nitrile is continuously fed into an elongated reaction zone and catalytically dehydrated during passage through said zone, the reaction effluent from said zone is continuously combined with steam, and the resulting mixture is continuously fed to a distillation zone in which it is flash distilled to provide said vapor phase and said liquid phase.

DESCRIPTION OF THE DRAWING

The invention will be more readily understood by reference to the following detailed description taken in conjunction with the accompanying drawing which is a schematic flow diagram representing a specific continuous embodiment of the process of this invention. In the embodiment shown in the drawing, a mixture of a liquid hydroxylated paraffinic nitrile and a suitable dehydration catalyst flows in a continuous stream from the bottom of a flash distillation column 2 through line 3 to a pump 4 by which it is fed through line 5 to a reboiler 6 to be heated by any suitable method, for example by indirect heat exchange with steam fed through line 7 and withdrawn as condensate through line 8. The temperature and residence time in reboiler 6 are controlled so that the catalyzed reaction of the hydroxylated paraffinic nitrile has approached substantial equilibrium when the reaction mixture flows out of the reboiler through line 9. In accordance with the present invention, the mixture in line 9 containing unreacted hydroxylated paraffinic nitrile and the corresponding olefinic nitrile reaction product is combined with steam injected via line 10 from any suitable source (not shown). The resulting mixture is flash distilled in column 2 which is maintained at a pressure (somewhat lower than in line 9) and temperature suitable for azeotropic distillation of the olefinic nitrile and water. The vapor phase from the distillation, containing a high proportion of the olefinic nitrile product and steam, passes overhead from column 2 through line 11 and into a condenser 12 in which the olefinic nitrile and steam are substantially completely condensed by any suitable method, for example by indirect heat exchange with a stream of water flowing through condenser 12 via line 13. The condensate flows through line 14 to a decanter 15 in which it is permitted to settle into a layer substantially comprised of the olefinic nitrile product and a generally heavier layer substantially comprised of water. The two layers are separately withdrawn from decanter 15 via lines 16 and 17, after which the olefinic nitrile layer can be further purified, if desired, by any suitable means (not shown). The liquid product of the distillation in column 2, containing unreacted hydroxylated paraffinic nitrile, catalyst and side products of the reaction, is collected in the bottom of column 2 for recycle through the reaction zone. To prevent the accumulation of high-boiling reaction side products in the system, a portion of the liquid mixture from the bottom of column 2 is continuously withdrawn from the system as a tails stream 18. Fresh hydroxylated paraffinic nitrile is fed to column 2 through line 19 and make-up catalyst is added to the system through line 20, 20' or 20".

PREFERRED EMBODIMENTS OF THE INVENTION

The process of this invention is useful in the production of any olefinic nitrile that can be prepared by catalytic dehydration of an hydroxylated paraffinic nitrile. Good results are obtained when the invention is utilized in the conversion of hydroxylated paraffinic nitriles containing up to 20 or more carbon atoms to the corresponding olefinic nitriles, and particularly high yields are provided in the dehydration of hydroxylated paraffinic nitriles containing 3 to 8 carbon atoms. Best results are obtained with nitrile starting materials that are straight-chain and/or which contain an hydroxyl substituent on the carbon atom furthermost from the nitrile group, such as 3-hydroxypropionitrile, 4-hydroxybutyronitrile, 5-hydroxyvaleronitrile, etc., although the invention is also applicable to nitriles that are branched-chain and/or contain an hydroxyl substituent on a non-terminal carbon atom in the chain, such as 3-hydroxy-2-methylpropionitrile, 3-hydroxy-3-methylpropionitrile, 2 - hydroxybutyronitrile, etc.

The hydroxylated paraffinic nitrile can be catalytically dehydrated in a batch operation, as aforesaid, before flash distillation in accordance with this invention or, as shown in the drawing, the process can be carried out in a continuous manner. In either batch or continuous operation, the starting material can be an essentially pure hydroxylated paraffinic nitrile, or, if desired, a mixture thereof with one or more compounds that do not interfere with the dehydration reaction by preventing substantial conversion of the hydroxylated starting material to the desired olefinic nitrile product. Thus, the process can be conveniently employed, if desired, in the production of an olefinic nitrile from mixtures of side-products of other reactions such as, for example, the production of adiponitrile by electro-hydrodimerization of acrylonitrile, in which a mixture of side products including 3-hydroxypropionitrile may be produced in sufficient quantity that conversion of the hydroxylated nitrile back to acrylonitrile for recycle to the dimerization process would be economically attractive. The concentration of hydroxylated paraffinic nitrile in such a mixture is not critical in the process of this invention and may range between the smallest concentration that would economically justify the use of the present process and substantially 100 percent of the mixture. When used in connection with the aforementioned electrolytic process for preparing adiponitrile, the feed to the process of this invention may contain on the order of 10 to 40 percent adiponitrile, although much higher concentrations of the dinitrile do not detract substantially from the advantages of the present process.

The catalyst in the process of this invention can be any substance capable of catalyzing the dehydration of an hydroxylated paraffinic nitrile to the corresponding olefinic nitrile. Suitable catalysts can be basic or acidic, solid or liquid at the reaction conditions, soluble or insoluble in water, and include many metal (e.g. alkali and alkaline earth metal) hydroxides and salts of organic acids such as sodium formate, calcium acetate, potassium oxalate and the like. Preferably, the process is carried out with a water-soluble inorganic compound having an alkaline reaction, such as an alkali metal hydroxide, an alkaline earth metal) hydroxides and salts of organic acids monium hydroxide in which each alkyl group can contain, for example, from one to eight carbon atoms. Best results are obtained in the process of this invention with the use of an alkali metal hydroxide, and sodium hydroxide is particularly preferred. When such catalysts are employed, it is usual to include enough of the catalyst to maintain the reaction mixture at a pH greater than 7. With the use of an alkali metal hydroxide catalyst, superior results are usually obtained when the reaction mixture initially contains between about 0.01 and about 0.1 mole of catalyst per mole of the hydroxylated paraffinic nitrile, although higher or lower molar ratios of catalyst can be employed if convenient.

In general, it is desirable to carry out the dehydration reaction in the presence of as little water as is conveniently possible, and to initiate the reaction with not more than about 0.3 mole of water present in the mixture per mole of the hydroxylated paraffinic nitrile. Thus, with water-soluble catalysts that are solid at reaction temperatures and therefore conveniently added to the reaction mixture in an aqueous solution, it is preferable to add the catalyst to the mixture in a solution containing an amount of water not substantially greater than that required to facilitate handling of the solution. For example, when the catalyst is an alkali metal hydroxide such as sodium hydroxide, it is advantageously added to the reaction mixture in a concentrated aqueous solution which may contain up to 75 weight percent or more of the hydroxide, although solutions containing from about 15 to about 30 weight percent of the catalyst are generally preferred.

For the reasons already discussed, the preferred reaction temperatures are normally those that permit a suitably short reaction time and efficient product recovery from the reacted mixture without undesirably increasing the production of high-boiling side products. In general, reaction temperatures between about 120° and about 250° C. can be used, depending on the specific catalyst and hydroxylated paraffinic nitrile to be converted, the impurities (if any) in the starting material, the reaction pressure and other related process variables. In the dehydration of a lower molecular weight nitrile such as an hydroxypropionitrile, temperatures up to 220° C. may be employed, if desired, although it is generally preferable to carry out the reaction, in accordance with the process of this invention, between about 160° and about 180° C.

The reaction can be carried out under any pressure that is suitable for use with the specific starting material, reaction temperature, catalyst, etc. In general, approximately atmospheric pressures are adequate, although sub-atmospheric or elevated pressures up to 30 p.s.i.a. or higher can be used, if desired.

The preferred reaction times also vary with the specific catalyst and starting material, the other reaction conditions, the desired degree of conversion, etc. In some cases, residence times at dehydration reaction conditions of up to 120 minutes or longer can be employed. For lower molecular weight starting materials, i.e., those containing from three to eight carbon atoms, a residence time between about 10 minutes and about 90 minutes is usually adequate, and a period of from 30 to 60 minutes is generally preferred for optimum yields.

After substantial dehydration of the hydroxylated starting material has taken place, and preferably after the dehydration reaction has reached substantial equilibrium under the conditions in use, the reaction effluent containing unreacted hydroxylated paraffinic nitrile and the olefinic nitrile product is combined with steam and then flash distilled. When carried out in accordance with the present invention, the steam injection and flash distillation are highly effective in separating the desired olefinic nitrile product from the unreacted hydroxylated paraffinic nitrile and other impurities and side-products in the reaction effluent without extensive loss of the olefinic nitrile product through degradation or reversal of the dehydration reaction. For best results, the steam should have sufficient heat content that it does not condense substantially on being combined with the reaction effluent. It is also generally preferable to add an amount of steam that is sufficient to form an azeotropic mixture with a major proportion, and preferably substantially all of the olefinic nitrile in the reaction effluent at the flash distillation conditions. In general, the use of between about 0.2 and about 10 moles of steam per mole of olefinic nitrile in the reaction effluent is desirable, and from about 0.5 to about 5 moles of steam per mole of the olefinic nitrile are usually preferred for efficient operation with high yields. With the use of a proportion of steam within that range, and particularly between 1 and 2 moles of steam per mole of the olefinic nitrile, the dehydration reaction can be carried out at an advantageously low temperature with substantially complete separation of the olefinic nitrile from the reaction effluent and negligible loss of product by degradation.

After the reaction effluent and steam have been combined and preferably while substantially all of the steam remains uncondensed, the resulting mixture is flash distilled under conditions that effect a separation of the mixture into a vapor phase that contains a substantial and preferably major proportion of the olefinic nitrile product of the reaction and a liquid phase that contains a substantial and preferably major proportion of the unreacted hydroxylated paraffinic nitrile. In most cases, the use of appropriate conditions will provide vapor and liquid phases that contain, respectively, substantially all of the olefinic nitrile and the unreacted nitrile. In general, and particularly when the unreacted nitrile is recycled for improvement of the overall process yield, it is also desirable to carry out the process under such conditions that the vapor phase contains a major portion, and preferably substantially all of the water from the distilled mixture.

The mixture can be distilled at any temperature and pressure that are suitable for the desired separation and stability of the olefinic nitrile product. Approximately atmospheric pressures are normally suitable, although sub-atmospheric or elevated pressures up to about 30 p.s.i.a. or higher can be used. Satisfactory distillation can usually be accomplished with a pressure drop between about one and about five p.s.i. although a drop as small as a fraction of one p.s.i. or as large as 15 p.s.i. or more may be appropriate in some instances. In general, the distillation is carried out at a temperature that is lower than the boiling point of the unreacted hydroxylated paraffinic nitrile but higher than that of the olefinic nitrile or, when the olefinic nitrile forms a low-boiling azeotrope with water, higher than the boiling point of the azeotrope. Preferred temperatures for the distillation depend on the pressure at which it is carried out, the volatilities of the specific nitriles and azeotropic mixtures of the olefinic nitrile and water, the desired degree of separation, etc. In most cases, and particularly with nitriles of lower molecular weight, the dehydration reaction temperature will be suitable for subsequent flash distillation of the reaction effluent and steam, although the temperature of the substantially reacted mixture can be raised prior to distillation if desired, e.g. by combination with superheated steam.

The vapor phase that results from flash distilling the mixture of steam and reaction effluent can be collected and condensed by conventional means, and the olefinic nitrile can be recovered from the resulting condensate in high purity by any convenient method such as decantation after permitting the condensate to separate into a predominantly aqueous layer and a generally lighter organic layer rich in the olefinic nitrile product. The liquid phase produced by the flash distillation can be wholly withdrawn from the system, if desired, to minimize the formation of undesirable side products (e.g. high-boiling, viscous materials) that usually result when intermediate side products in the liquid phase are recycled through the reaction zone. However, the liquid phase normally contains sufficient unreacted hydroxylated paraffinic nitrile that recycling at least a portion thereof is desirable to raise the yield of olefinic nitrile based on the hydroxylated paraffinic nitrile fed to the system. If desired, side products of the reaction can be separated from the liquid phase before it is recycled to the reaction zone, although in embodiments of the process such as that shown in the drawing, it is generally preferable to continuously withdraw from the system a portion of the liquid phase that is sufficient to maintain the concentration of side products in the reaction zone at a practical level and recycle the remainder of the liquid phase to the reaction zone without prior purification.

The following examples are included to illustrate the advantages of the process of this invention for producing an olefinic nitrile by catalytically dehydrating an hydroxylated paraffinic nitrile and flash distilling a mixture of the reaction effluent and steam, and are not intended to be representative of any limitation of the scope of the invention. Percentages are by weight except where noted otherwise.

EXAMPLE I

In steady state operation of a continuous catalytic dehydration system of the type shown in the drawing, a liquid mixture having the following composition was fed to the column at a temperature of 25° C. and at the rate of 109 grams per minute.

| Component: | Percentage of mixture |
|---|---|
| 3-hydroxypropionitrile | 59.57 |
| Adiponitrile | 36.25 |
| Water | 1.20 |
| Meta-glutaronitrile | 1.19 |
| Acrylonitrile | 0.90 |
| Succinonitrile | 0.63 |
| Monocyanoethylamine | 0.26 |
| Total | 100.0 |

A solution of 25% sodium hydroxide in water was fed to the pressure side of the pump at the rate of 6 grams per minute, and the reaction mixture was heated to 170° C. in the reboiler. After a residence time of 42 minutes in the reboiler, the dehydration reaction had reached substantial equilibrium. Dry steam from a 150 p.s.i.g. source was combined with the reboiler effluent at the rate of 20.7 grams per minute to provide a mixture of reaction effluent and steam having a temperature of 172° C. and a presure of approximately 16.7 p.s.i.a. About 0.1 second after addition of the steam, the mixture was flash distilled in the column at a pressure of approximately 15.2 p.s.i.a. The vapor produced by the distillation was condensed and permitted to separate into an aqueous layer and an organic layer. Analysis of the organic layer showed that it contained 81.8% acrylonitrile, 6.9% adiponitrile, 4.3% 3-hydroxypropionitrile and 0.6% bis-cyanoethylether. The liquid phase from the distillation was combined with the fresh feed in the column and the resulting mixture was passed to the reboiler with the exception of a liquid tails stream that was continuously withdrawn from the system at the rate of 41 grams per minute. The tails stream contained 1% water and 1–2% acrylonitrile. The conversion of 3-hydroxypropionitrile to acrylonitrile per pass was 3.4%. The overall yield of acrylonitrile based on 3-hydroxypropionitrile fed to the system was 92.1%.

Comparative Example A

When the procedure of Example I was substantially duplicated with the exception that instead of combining steam with the reboiler effluent, an additional 17.5 grams per minute of water were fed to the pressure side of the pump together with the catalyst solution, the yield of acrylonitrile was 74.6%.

Comparative Example B

In steady state operation of the system used in Example I, 21.3 grams per minute of water, 2.1 milliliters per minute of 50% sodium hydroxide in water, and 109 grams per minute of a mixture having the following composition were fed to the column at a temperature of 25° C.

| Component: | Percentage of mixture |
|---|---|
| 3-hydroxypropionitrile | 66.49 |
| Adiponitrile | 27.10 |
| Water | 2.37 |
| Meta-glutaronitrile | 1.53 |
| Acrylonitrile | 1.68 |
| Succinonitrile | 0.43 |
| Monocyanoethylamine | 0.40 |
| Total | 100.0 |

The mixture was heated to 180° C. during a residence time of 42 minutes in the reboiler and then flash distilled in the column. Vapor product was condensed and separated as in Example I and the liquid phase was recycled with the exception of a liquid tails stream that was continuously withdrawn at the rate of 58 grams per minute. The tails stream contained 13% acrylonitrile and 34% water. The overall yield of acrylonitrile was 45.9%.

Comparative Example C

In steady state operation of the system used in Example I, 24.5 grams per minute of 6.5% sodium hydroxide in water and 109 grams per minute of the mixture used in Example B were fed to the column at a temperature of 173° C. The mixture was heated to 213° C. in the reboiler during a residence time of 42 minutes and then flash distilled in the column. Vapor and liquid products were recovered and recycled, respectively, as in Example B. The overall yield of acrylonitrile was 60.3%.

We claim:

1. In a process for preparing an olefinic nitrile containing 3 to 8 carbon atoms wherein a liquid monohydroxylated paraffinic nitrile containing 3 to 8 carbon atoms is catalytically dehydrated between about 120° and about 250° C. providing a dehydration reaction effluent containing unreacted liquid monohydroxylated paraffinic nitrile and the corresponding monoolefinic nitrile, the improvement which comprises combining with said effluent, after substantial dehydration of the monohydroxylated paraffinic nitrile has taken place, between about 0.2 and about 10 moles of steam per mole of olefinic nitrile in said effluent without substantial condensation of said steam and then flash distilling the resulting mixture at a temperature and pressure which provide a vapor phase containing a major proportion of the olefinic nitrile from said effluent and a major proportion of said steam and a liquid phase containing a major proportion of the unreacted monohydroxylated paraffinic nitrile from said effluent.

2. A process, as defined in claim 1, in which the steam is combined with the reaction effluent after the dehydration reaction has reached substantial equilibrium.

3. A process, as defined in claim 1, in which sufficient steam is combined with the reaction effluent to form an azeotropic mixture with the olefinic nitrile in the effluent.

4. A process, as defined in claim 1, which further comprises collecting and condensing the vapor phase and recovering the olefinic nitrile from the resulting condensate.

5. A process, as defined in claim 1, in which the dehydration reaction is carried out in the presence of a water-soluble dehydration catalyst.

6. A process, as defined in claim 5, in which the dehydration catalyst is an organic compound having an alkaline reaction.

7. A process, as defined in claim 5, in which the dehydration catalyst is selected from the group consisting of alkali metal hydroxides, alkaline earth metal hydroxides and quaternary alkyl ammonium hydroxides in which each alkyl group contains from one to eight carbon atoms.

8. A process, as defined in claim 5, in which the dehydration catalyst is sodium hydroxide.

9. A process, as defined in claim 5, in which the dehydration reaction is initiated in the presence of not more than about 0.3 mole of water per mole of the hydroxylated paraffinic nitrile.

10. A process, as defined in claim 1, in which the hydroxylated paraffinic nitrile contains an hydroxyl substituent on the carbon atom furthermost from the nitrile group.

11. A process, as defined in claim 1, in which the hydroxylated paraffinic nitrile is 3-hydroxypropionitrile and the olefinic nitrile is acrylonitrile.

12. A process, as defined in claim 1, in which the dehydration reaction is carried out at a pH greater than 7.

13. A process, as defined in claim 1, in which the dehydration reaction mixture initially contains between about 0.01 and about 0.1 mole of an alkali metal hydroxide per mole of the monohydroxylated paraffinic nitrile.

References Cited

UNITED STATES PATENTS

| 2,392,303 | 1/1946 | Balcar | 260—465.9 |
| 2,413,773 | 1/1947 | Miller | 260—465.9 |
| 2,500,403 | 3/1950 | Davis et al. | 260—465.9 |
| 2,555,798 | 6/1951 | Kropa | 260—465.9 XR |
| 2,729,670 | 1/1956 | De Bruin | 260—465.9 |
| 2,790,822 | 4/1957 | Wolfram et al. | 260—465.9 |
| 3,267,131 | 8/1966 | Campbell et al. | 260—465.9 XR |
| 3,280,168 | 10/1966 | Campbell et al. | 260—465.9 |

CHARLES B. PARKER, Primary Examiner

S. T. LAWRENCE, Assistant Examiner

U.S. Cl. X.R.

203—88, 91, 92, 95, 96; 260—465.8